(12) United States Patent
Song

(10) Patent No.: US 10,685,480 B2
(45) Date of Patent: Jun. 16, 2020

(54) RENDERING VOLUMES USING APPLE GRADUATIONS IN MULTIPLE DIMENSIONS

(71) Applicant: VRcaffeine LLC, Silver Spring, MD (US)

(72) Inventor: Sunbin Song, Silver Spring, MD (US)

(73) Assignee: VRCAFFEINE LLC, Silver Springs, MD (US)

(*) Notice: Subject to any disclaimer, the term of this patent is extended or adjusted under 35 U.S.C. 154(b) by 0 days.

(21) Appl. No.: 16/284,745

(22) Filed: Feb. 25, 2019

(65) Prior Publication Data
US 2019/0266790 A1    Aug. 29, 2019

Related U.S. Application Data

(60) Provisional application No. 62/635,230, filed on Feb. 26, 2018.

(51) Int. Cl.
*G06T 17/00* (2006.01)
*G06T 15/08* (2011.01)

(52) U.S. Cl.
CPC .............. *G06T 17/00* (2013.01); *G06T 15/08* (2013.01)

(58) Field of Classification Search
CPC ...... G06T 17/00; G06T 15/08; G06T 2210/41
See application file for complete search history.

(56) References Cited

U.S. PATENT DOCUMENTS

| 2010/0239140 | A1  | 9/2010 | Ruijters et al. |
| 2017/0206686 | A1* | 7/2017 | Mazeh ................ G09B 23/30 |

(Continued)

FOREIGN PATENT DOCUMENTS

| JP | 2014-054378 A | 3/2014 |
| JP | 2017-148480 A | 8/2017 |
| KR | 10-2013-0026853 A | 3/2013 |

OTHER PUBLICATIONS

Andolfi C, Plana A, Kania P, Banerjee P, Small S. Usefulness of three-dimensional modeling in surgical planning, resident training, and patient education. Journal of laparoendoscopic and advanced surgical techniques. vol. 27, No. 5, 2017.

(Continued)

*Primary Examiner* — William A Beutel
(74) *Attorney, Agent, or Firm* — Fountainhead Law Group P.C.

(57) ABSTRACT

In one embodiment, a method receives voxel coordinates of voxels in a second volume in the image and generates links for the voxels in the second volume in x, y, and z directions. An angle twist is calculated for the links of the voxels based on the voxel coordinates for each voxel in the second volume. Links for adjacent voxels along each of an x, y, and z axis are twisted by different angle gradations as distance along the axis increases. The method calculates an orientation of the links for the second volume. The second orientation is different from a first orientation of the links for the first volume. The links for the voxels of the second volume are rendered in the three dimensional space where the links are rendered with the calculated angle twist in the x, y, and z directions and the second orientation.

20 Claims, 16 Drawing Sheets
(9 of 16 Drawing Sheet(s) Filed in Color)

(56) References Cited

U.S. PATENT DOCUMENTS

| | | | | |
|---|---|---|---|---|
| 2018/0189985 A1* | 7/2018 | Grimm | ............... | G06T 11/003 |
| 2018/0357815 A1* | 12/2018 | Benner | ............... | A61B 5/0042 |

OTHER PUBLICATIONS

Diana M, Soler L, Agnus V, D'Urso A, Vix M, Dallemagne B, Faucher V, Roy C, Mutter D, Marascaux J, Pessaux Prospective evaluation of precision multimodal gallbladder surgery navigation: Virtual reality, near-infrared fluorescence, and X-ray based intraoperative cholangiography.(2017) Annals of Surgery 266(5): 890-897.

Douglas DB, Boone JM, Petricoin E, Liotta L, Wilson E. 2016. Augmented reality imaging system: 3D viewing of a breast cancer. J Nat Sci.

Douglas DB, Petricoin E, Liotta L, Wilson E 2016b. D3D augmented reality imaging system: proof of concept in mammography.

Elmi-Terander A, Skulason H, Soderman M, Racadio J, Homan R, Babic D, van der Vaart N, Nachabe R. Surgical navigation technology based on augmented reality and integrated 3D intraoperative imaging: A spine cadaveric feasibility and accuracy study. (2016) Spine.

Elmi-Terander A, Nachabe R., Skulason H, Pedersen K, Soderman M, Racadio J, Babic D, Gerdhem P, Edstrom E. Feasibility and accuracy of thoracolumbar minimally invasive pedicle screw placement with augmented reality navigation technology. Spine 2018.

Ghaderi MA, Heydarzadeh M, Nourani M, Gupta G, Tamil L. Augmented reality for breast tumors visualization (2018). IEEE.

Hanna MG, Ahmed I, Nine J, Prajapati S, Pantanowitz L. 2018. Augmented reality technology using Microsoft hololens in anatomic pathology.

Hekman MCH, Rijpkema M, Langenhuijsen JF, Boerman OC, Oosterwijk E, Mulders PFA (2017). Intraoperative Imaging Techniques to Support Complete Tumor Resection in Partial Nephrectomy. European Urology Focus. (http://dx.doi.org/10.1016/j.euf.2017.04.008.

Hou Y, Ma L, Zhu R, Chen X, Zhang J. A low-cost iPhone-assisted augmented reality solution for the localization of intracranial lesion. PloS one 2016.

Hou Y, Ma L, Zhu R, Chen X. iPhone-assisted augmented reality localization of basal ganglia hypertensive hematoma (2016, vol. 94, p. 480-492).

Jensen JK, Dyre L, Jorgensen ME, Andreasen LA, Tolsgaard. Simulation-based point-of-care ultrasound training: a matter of competency rather than volume. 2018. Acta Anaesthesiologica Scandinavica.

Lee SC, Fuerst B, Tateno K, Johnson A, Fotouhi J, Osgood G, Tombari F, Navab N (2017) Multi-modal imaging, model-based tracking, and mixed reality visualization for orthopaedic surgery. Healthcare technology letters.

Li Q, Huang C, Lv S, Li Z, Chen Y, Ma L. (2018) An human-computer interactive augmented reality system for coronary artery diagnosis planning and training. Journal of Medican Systems 2017: 41-159.

Marker D, U-Thainual PU, Ungi T, Flammang AJ, Fichtinger G, Iordachita II, Canino JA, Fritz J. 1.5 T augmented reality navigated interventional MRI: paravertebral sympathetic plexus injections. Diagn Intery Radio 2017: 23: 227-232.

Sato Y, Nakamoto M, Tamaki Y, Sasama T, sakita I, Nakajima Y, Monden M, Taumura S. (2018). Image guidance of breast cancer surgery using 3-D ultrasound images and augmented reality visualization.

Sedaghat F, Tuncali K. Enabling Technology for MRI-guided intervention (2018). Topics in Magnetic Resonance Imaging 27(1):5-8 2018.

Siebert JN, Ehrler F, Gervaix A, Haddad K, Lacroix L, Schrurs P, Sahin A, Lovis C, Manzano S (2017). Adherence to AHA Guidelines when adapted for augmented reality glasses for assisted pediatric cardiopulmonary resuscitation: A randomized controller trial. JMIR.

Sun G, Chen X, Hou Y, Yu X, Ma X, Liu G, Liu L, Zhang J, Tang H, Zhu RY, Zhou DB, Xy B. Image-guided endoscopic surgery for spontaneous supratentorial intracerebral hematoma. J Neurosurg 2017.

Tang R, La L, Xiang C, Wang X, Li A, Liao H, Dong J. Augmented reality navigation in open surgery for hilar cholangiocarcinoma resection with hemihepatectomy using video-based in situ three-dimensional anatomical modeling. A case report. Clinical case report.

Tobias S, Claudia G, Gencay H, Michael M, Lena M, Markus H, Dogu T (2016) Journal of Endourology 2016.

Venson JE, Berni JCA Edmilson da Silva Maia C, Marques da silva AM, d'ornella MC, Maciel A (2017). A case-based study with radiologists performing diagnosis tasks in virtual reality. Precision Healthcare through informativs.

Werner H, Roberto Lopes Dos Santos J, Ribeiro G, Araujo Jr E, 2017. Prenatal phenotype of down syndrome using 3D virtual reality. JOCG.

International Search Report and Written Opinion for International Appln. No. PCT/US2019/019447 dated Jun. 5, 2019, 9 pages.

* cited by examiner

RENDERING VOLUMES USING APPLE GRADUATIONS IN MULTIPLE DIMENSIONS

CROSS REFERENCE TO RELATED APPLICATIONS

Pursuant to 35 U.S.C. § 119(e), this application is entitled to and claims the benefit of the filing date of U.S. Provisional App. No. 62/635,230 filed Feb. 26, 2018, the content of which is incorporated herein by reference in its entirety for all purposes.

BACKGROUND

Mainstream adoption of mixed reality technologies including virtual reality (VR) and augmented reality (AR) are poised to alter many industries including healthcare. Applications such as the radiological viewing of medical scans as well as surgical planning may be revolutionized by these technologies. One impediment to wide-scale utility and adoption is that current methods of three dimensional (3D) rendering focus on visualizing surfaces, outer voxels, or maximum intensity voxels while the majority of information in the interior of a 3D volume is not visualized.

For 3D volume values generated by techniques such as magnetic resonance imaging (MRI), computed tomography (CT), microCT, or other thin slice tomography (thin 2D slices of a 3D volume) scanning methods, in current practice, radiologists view the entire series of 2D slices and then must mentally reconstruct 3D spatial relationships. Due to the difficulty of this mental task, effort has been made to better visualize 3D volumes and spatial relationships. These include 1) direct volume rendering (DVR) in which a 2D projection of a 3D dataset is rendered, 2) isosurface rendering using a marching cubes algorithm to generate a surface model and 3) 3D model projections with maximum intensity projection. In DVR, every voxel is mapped to a specific opacity and color with a transfer function and using either volume ray casting, splatting, shear warp, or texture based volume rendering, and a 2D projection of a 3D volume is generated. These methods are often computationally expensive and generate an accurate visualization of surfaces of interest in the 3D volume but result in a 2D image rather than a 3D rendering and so cannot be rotated and viewed from different angles, and will be a flat 2D image even in a mixed reality environment. Similarly, maximum intensity projection shows voxels with maximum intensity that fall in the way of parallel ray traces drawn from the viewpoint and generates a 2D image from a 3D object. One 3D object that works in mixed reality is a mesh of the surface of a volume. An isosurface mesh renderings of a 3D volume can be generated with a marching cubes algorithm as a series of polygonal surface meshes or with volumetric meshes, with the caveat being that at any given time, only the small percentage of the voxels at the surface of a volumetric mesh is rendered or easily visible.

Usually, when multiple surfaces are overlaid atop of one another, to be visible, transparency is added to surface models to visualize surfaces of objects within objects, or point clouds are used, notwithstanding occlusion issues that do not allow good visualization of interiors. In other words, even with transparency, only a small percentage of the voxels at the surface of a 3D volume out of the total voxels in a 3D volume are visible either because they are the only ones rendered such as in surface models, or because they are the only ones not occluded with point clouds. Further, surface renderings require identification of hard edges (surface of lesion needs to be identified for example), which is often hard to determine in clinical scans in which the boundaries between diseased and healthy tissues are not well defined nor well demarcated. This is especially true in poor resolution scans like CT where a voxel may contain both healthy and diseased tissue and so is hard to classify as either healthy or diseased. In other words, many times lesions are visually resolvable as a gradation in scalar values and have subjectivity involved. This is a challenge for automated segmentation and computer vision as well, as algorithms often perform poorly compared to an experienced human radiologist who can compensate for the lack of hard edges by using a subjective clinical judgment of the visualized data. Even in good resolution scans, often structures of interest are interwoven with one another with unclear boundaries making it hard to represent the data with a 3D surface.

For this reason, 2D slices are often combined to view cross-sections of the 3D surface volume. Hence, different visualization techniques may be combined to present more complete visual understanding of a scanned volume. Again however, at any given time, only a small percentage of total voxels in a volume are visualized either because they are in that 2D slice (a small percentage of interior voxels) or at the surface for the 3D surface object (only exterior voxels).

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions.

The patent or application file contains at least one drawing executed in color. Copies of this patent or patent application publication with color drawing(s) will be provided by the Office upon request and payment of the necessary fee.

In the accompanying drawings:

FIG. 1 depicts a simplified system 100 for generating data visualizations according to some embodiments.

FIG. 2A depicts an example of three links according to some embodiments.

FIG. 2B shows a different perspective of the three links according to some embodiments.

FIG. 3A depicts an example of three links for three different voxels according to some embodiments.

FIG. 3B shows a different perspective of the three links for three different voxels according to some embodiments.

FIG. 3C illustrates examples of link shapes that can be used to represent a voxel according to some embodiments.

FIG. 4A depicts an example of the length of links in a voxel according to some embodiments.

FIG. 4B depicts a different perspective of the length of links if the link is extended to fill the cube as outlined above according to some embodiments FIG. 4C depicts an example of links that alternate negative and positive twists according to some embodiments.

FIG. 5 depicts a simplified flowchart of a method for rendering volumes according to some embodiments.

FIG. 6A depicts an example of a rendering of a volume of a brain according to some embodiments.

FIG. 6B depicts an example of links for voxels according to some embodiments.

Figure 6A:
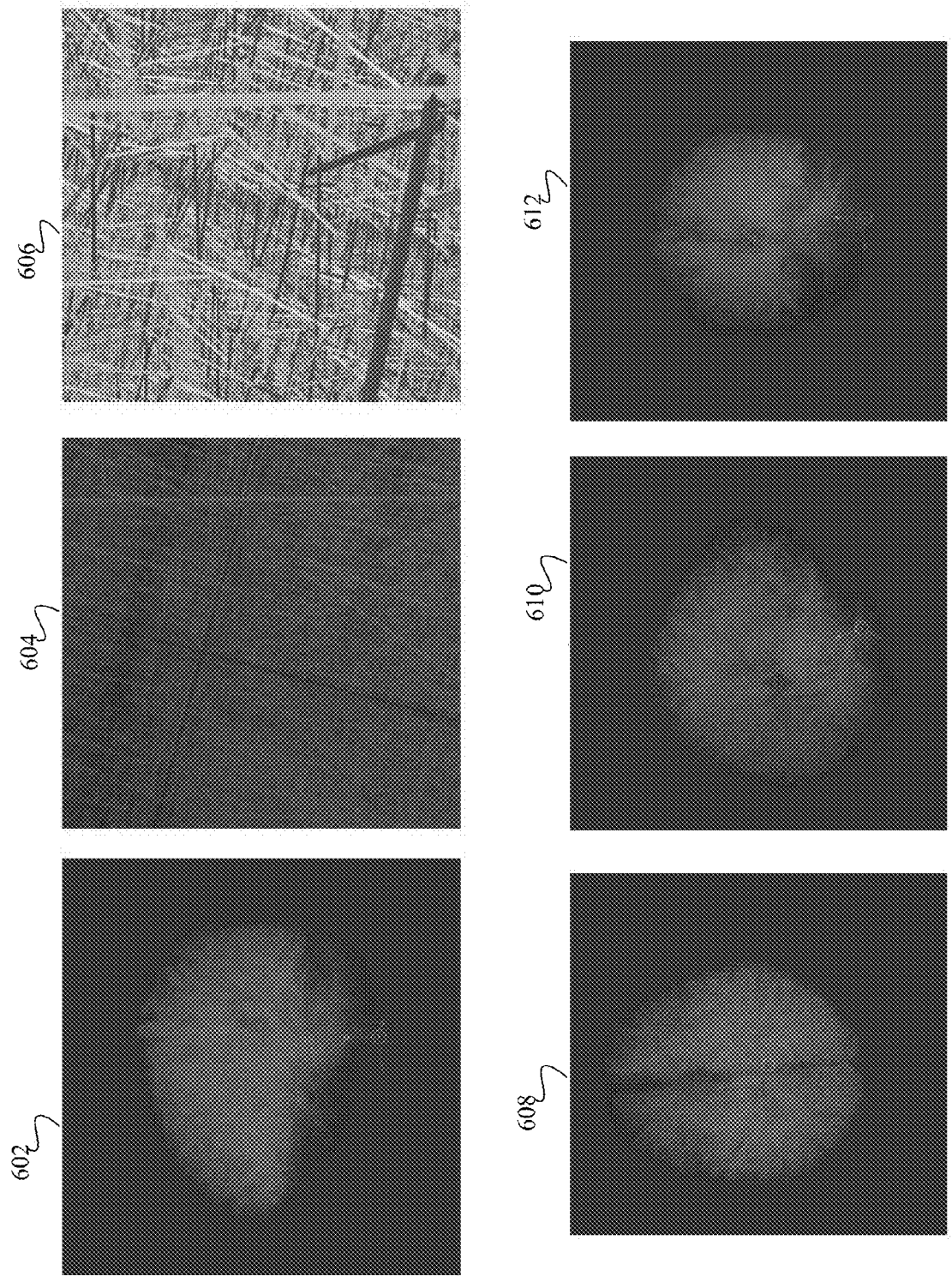
Figure 6B:
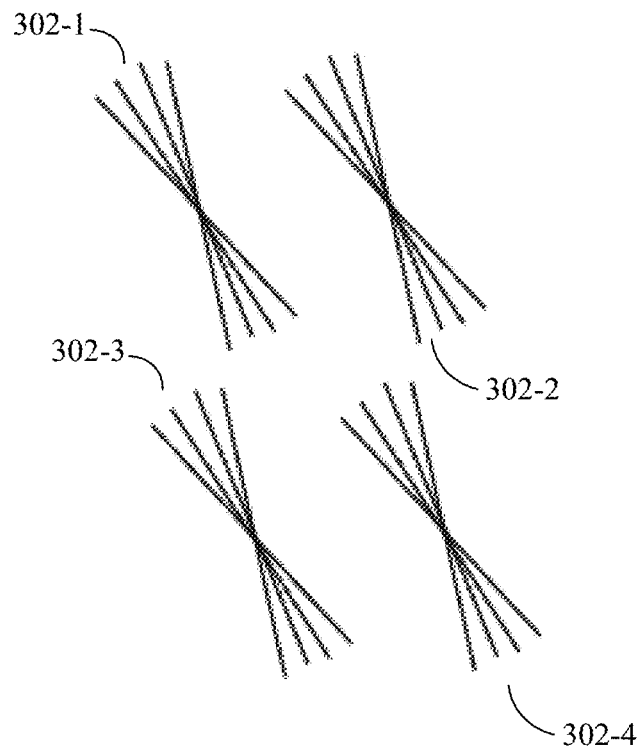
Figure 6C:
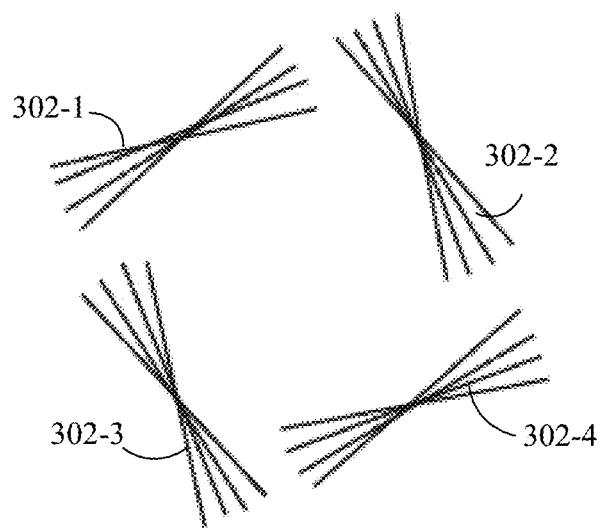

FIG. 6C depicts an example of links alternating in a negative and positive manner according to some embodiments.

Figure 6D:
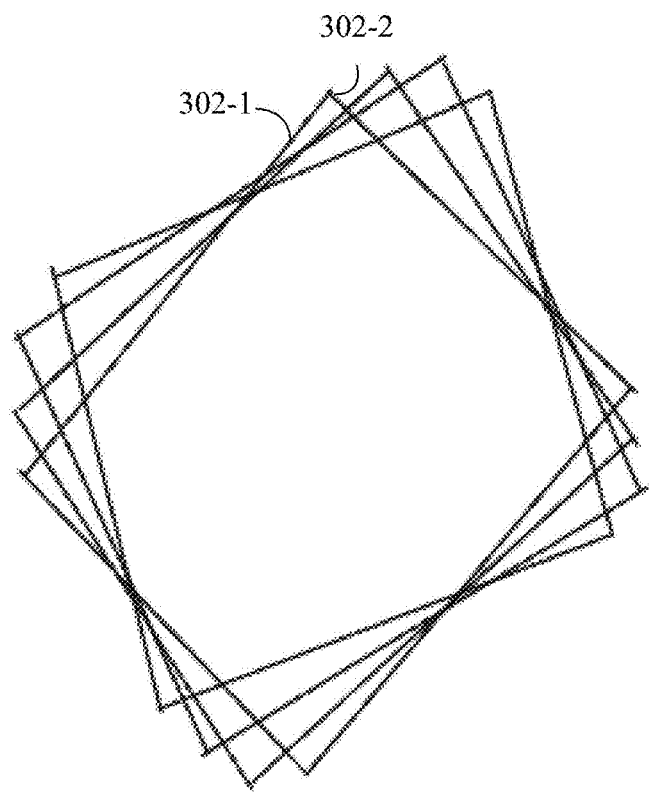

FIG. 6D depicts an example of lengthening links according to some embodiments.

Figure 6E:
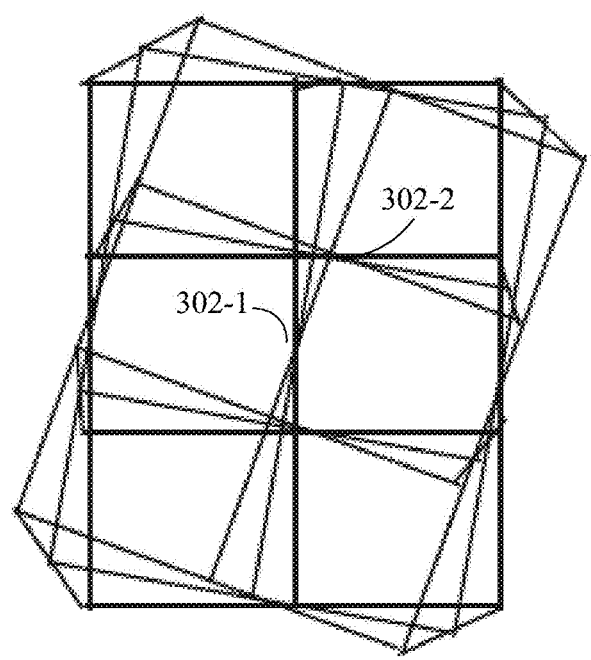

FIG. 6E depicts an example of twisted links for voxels according to some embodiments.

Figure 6F:
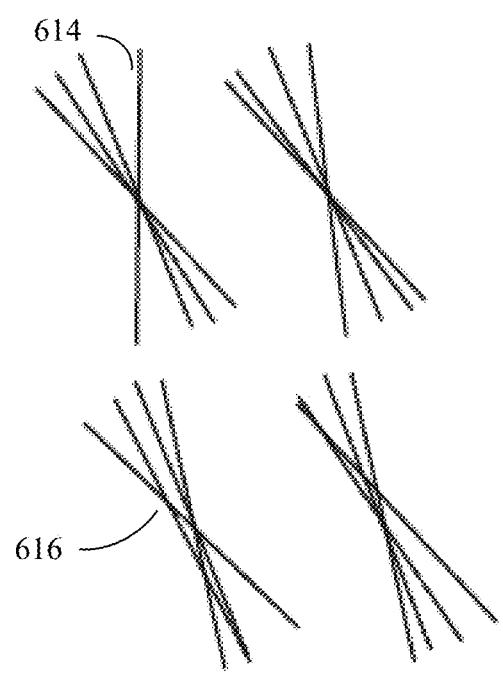

FIG. 6F depicts an example of adding jitter to links according to some embodiments.

Figure 7:
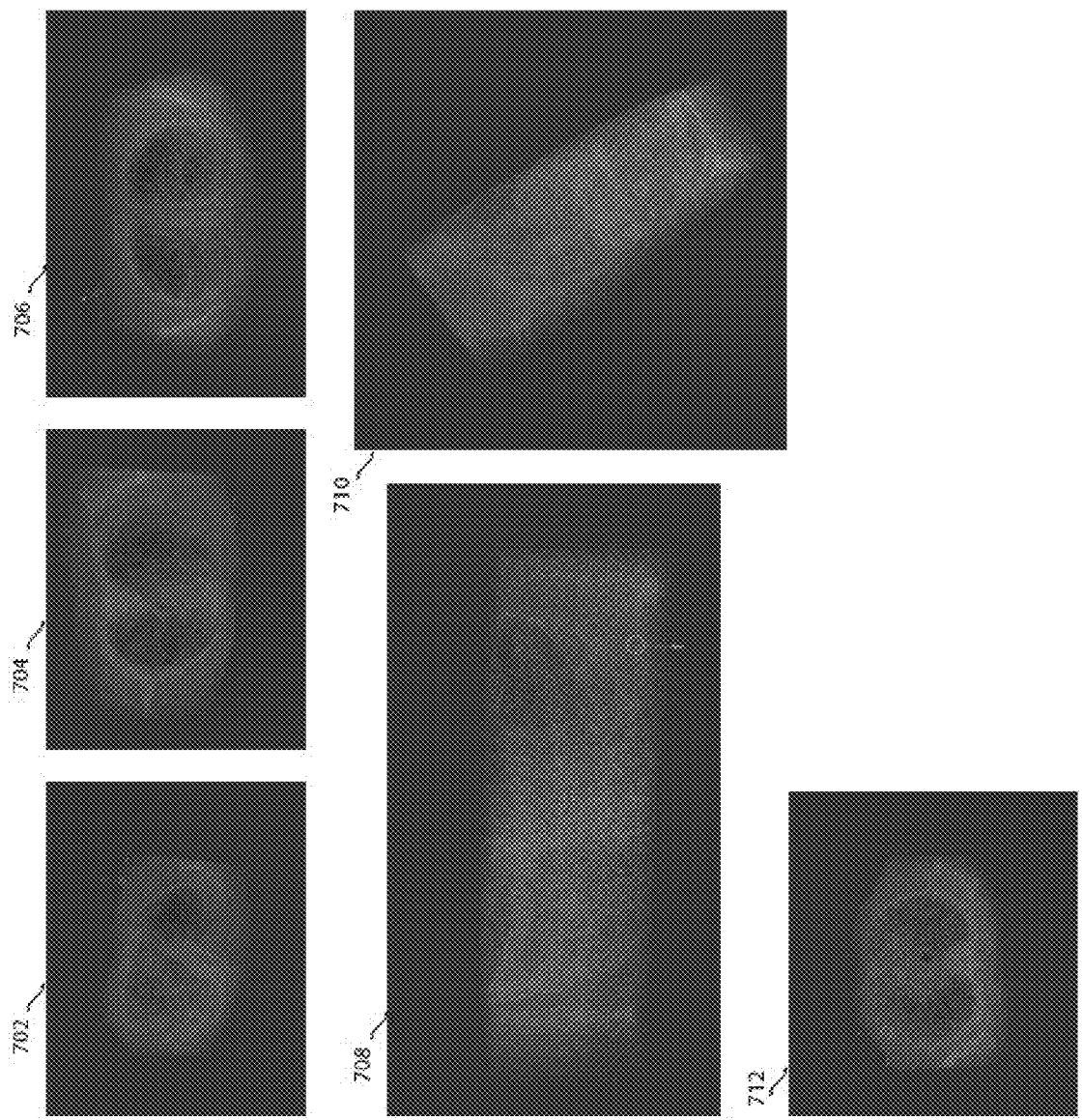

FIG. 7 depicts different views of one fishnet rendering for a volumetric image (a CT scan of the lungs) according to some embodiments.

Figure 8:
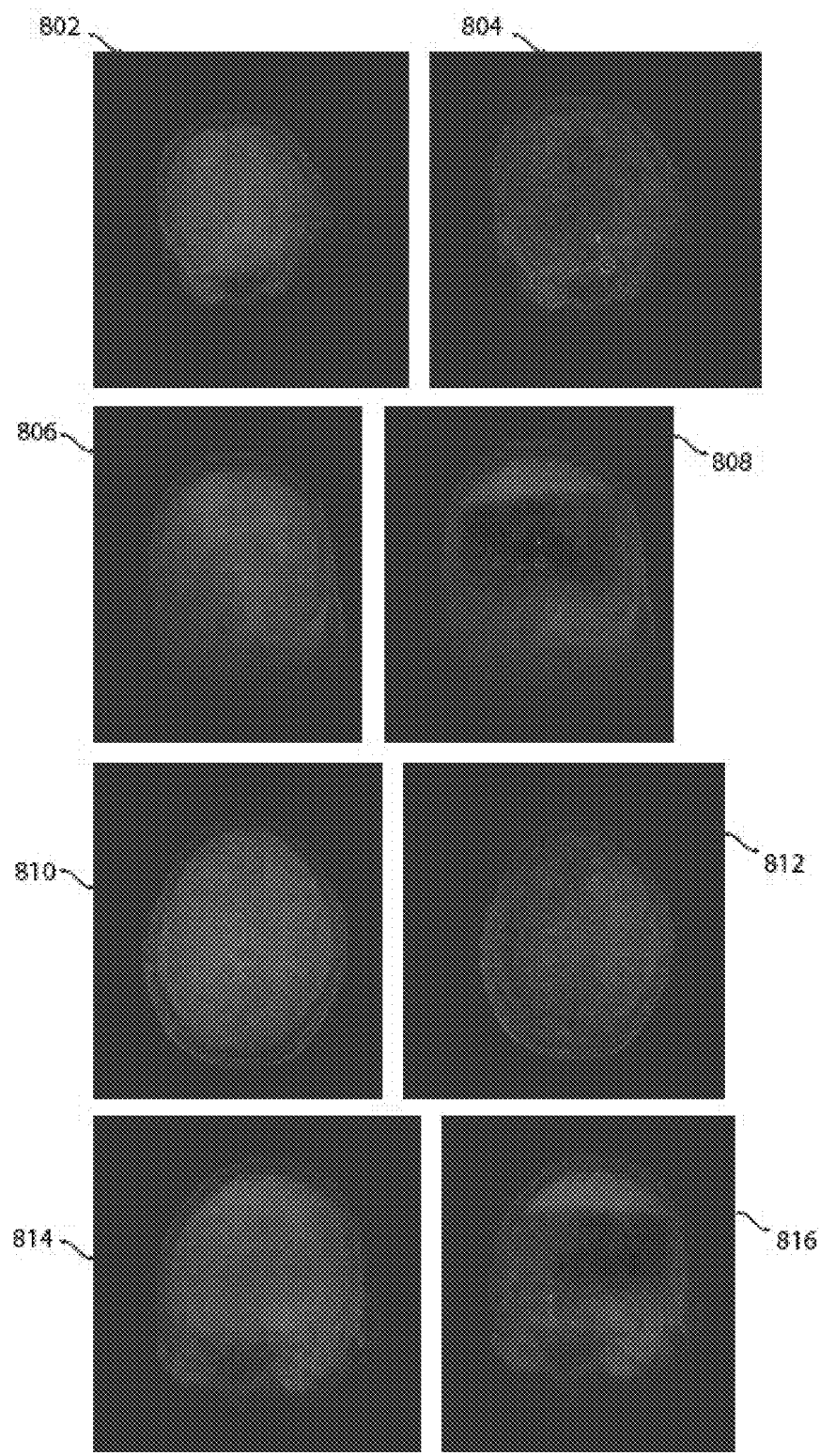

FIG. 8 depicts different views of another visualization of multiple volumes (e.g., a CT scan of the brain with a perfusion weighted image of the brain) according to some embodiments.

Figure 9:
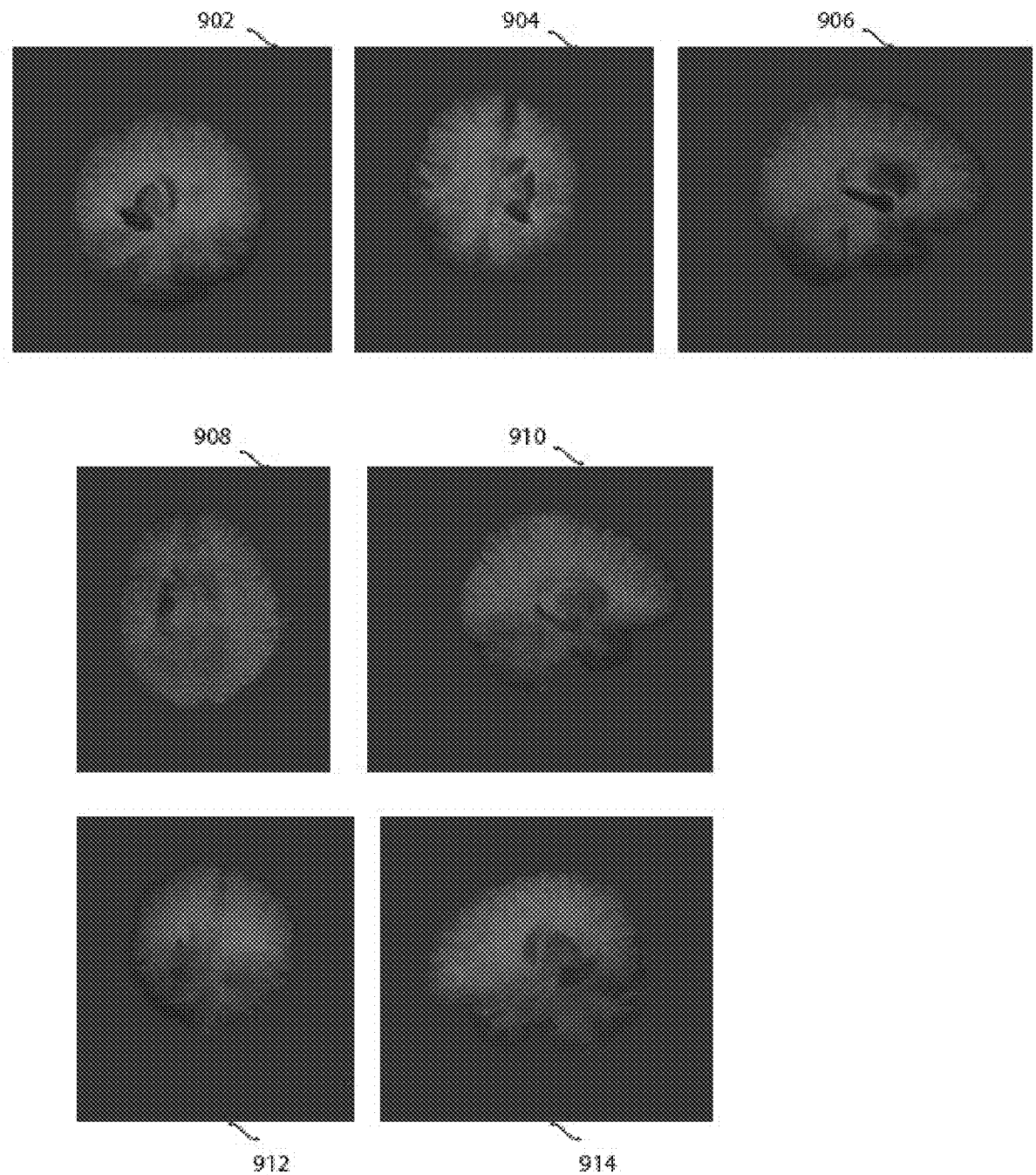

FIG. 9 depicts an example of a visualization with multiple volumes (e.g., MRI scan of the brain with segmented brain regions) according to some embodiments.

Figure 10:
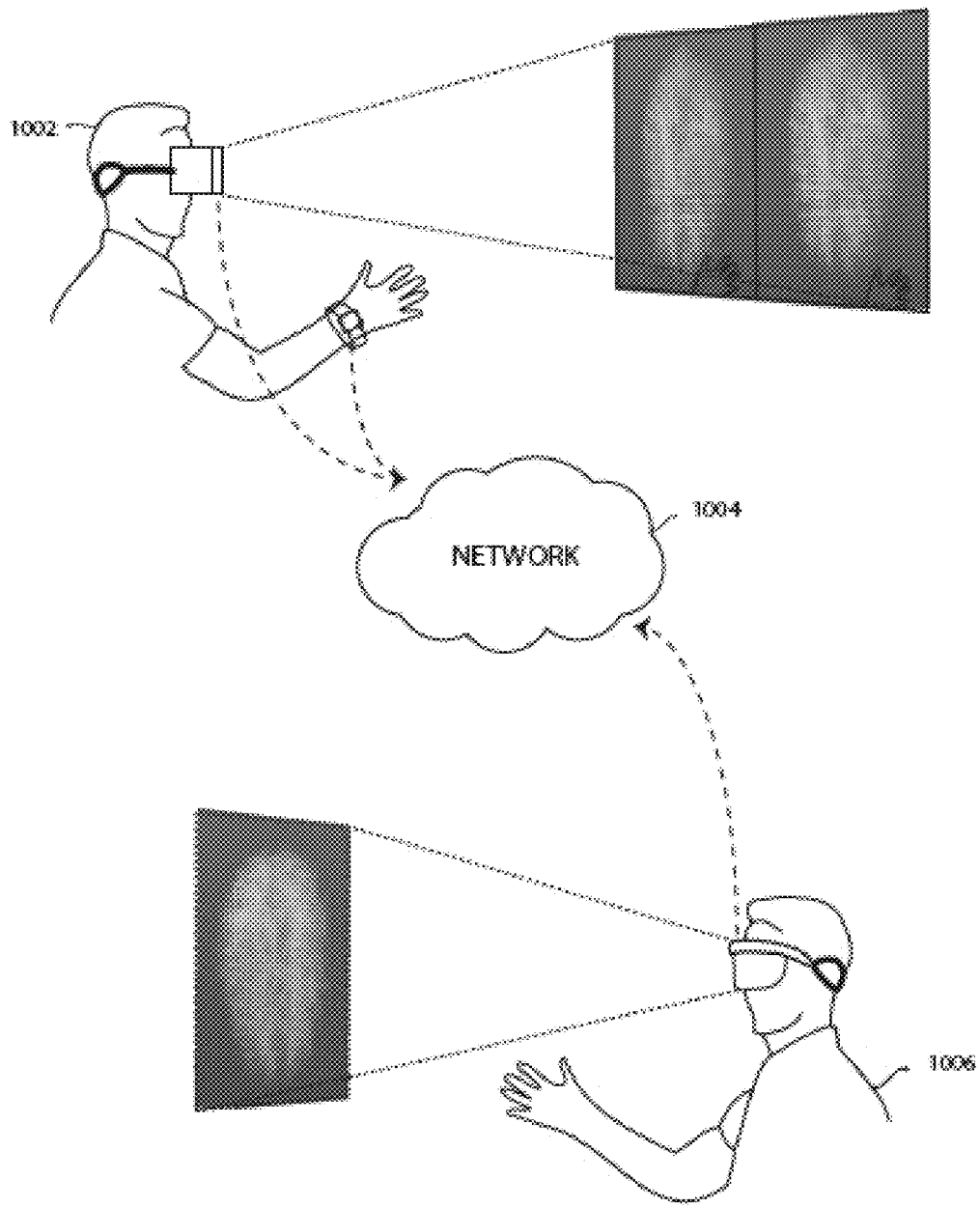

FIG. 10 depicts an example of using a mixed reality application to view visualizations according to some embodiments.

Figure 11:
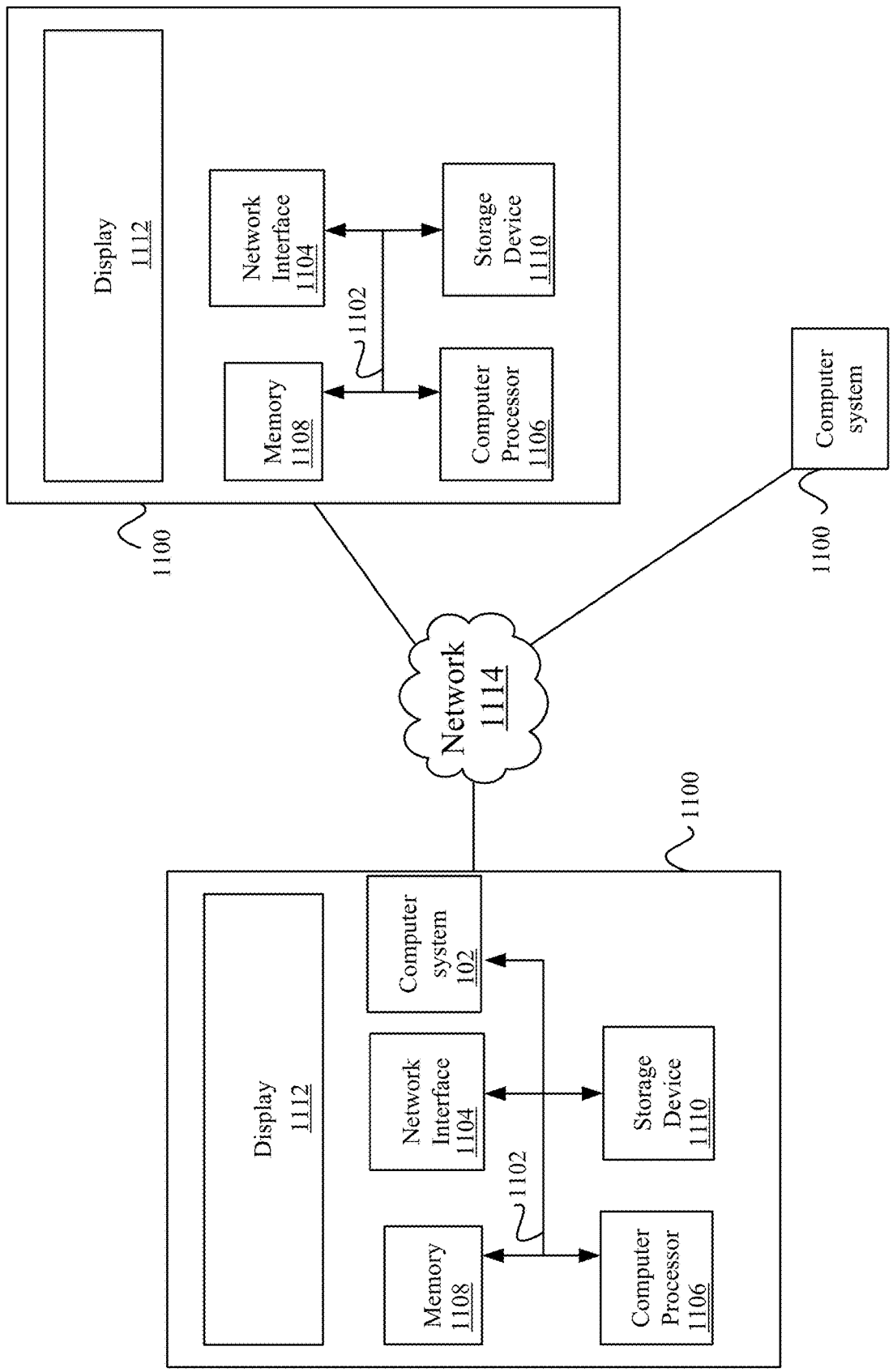

FIG. 11 illustrates an example of special purpose computer systems 1100 configured with computer system 102 according to one embodiment.

DETAILED DESCRIPTION

Described herein are techniques for a rendering system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments render the information present in a volume by representing voxels in the volume with a plurality of links that are connected between voxels. The links form a web of links, such as in the form of a 'fishnet', and the links include gradations of angles (e.g., twists) that are dependent on the position of the voxel in the x, y, z plane. When viewing multiple volumes, the respective links for each volume may be rotated (e.g., 'crosshatched') on top of one another to allow the multiple volumes to be viewed simultaneously. In some embodiments, the links of additional volumes are rotated (e.g., orthogonal or approximately orthogonal) to links from another volume, which supports ideal conditions for data visualization of multiple volumes simultaneously.

Some embodiments may also refine the visualization of the volume or volumes. For example, some embodiments may adjust the link lengths based on angle of the twist, add an offset shift to the center position of the link in respect to the position in the x, y, z plane, alternate negative and positive twists to create a more cohesive fishnet pattern, and add various forms of jitter to prevent moire patterns. Different link shapes may also be employed to aid in visualization of twists and prevent moire patterns.

Conventionally, 3D rendering for scanned volumes focused on rendering a small percentage of total voxels, such as outer surfaces, outer voxels, or maximum intensity voxels. However, in many use cases, it is useful to visualize all of the voxels in a 3D rendering of a 3D volume. Some embodiments render links for all of the voxels in a 3D array of voxels in a visualization. The use of the web of links allows the rendering of a representation of all the voxels. Also, each volume in the visualization may be crosshatched on top of one another allowing each volume to be viewed, which for many use cases, including medical ones, support ideal conditions for data visualization of volumetric information.

System Overview

Figure 1:
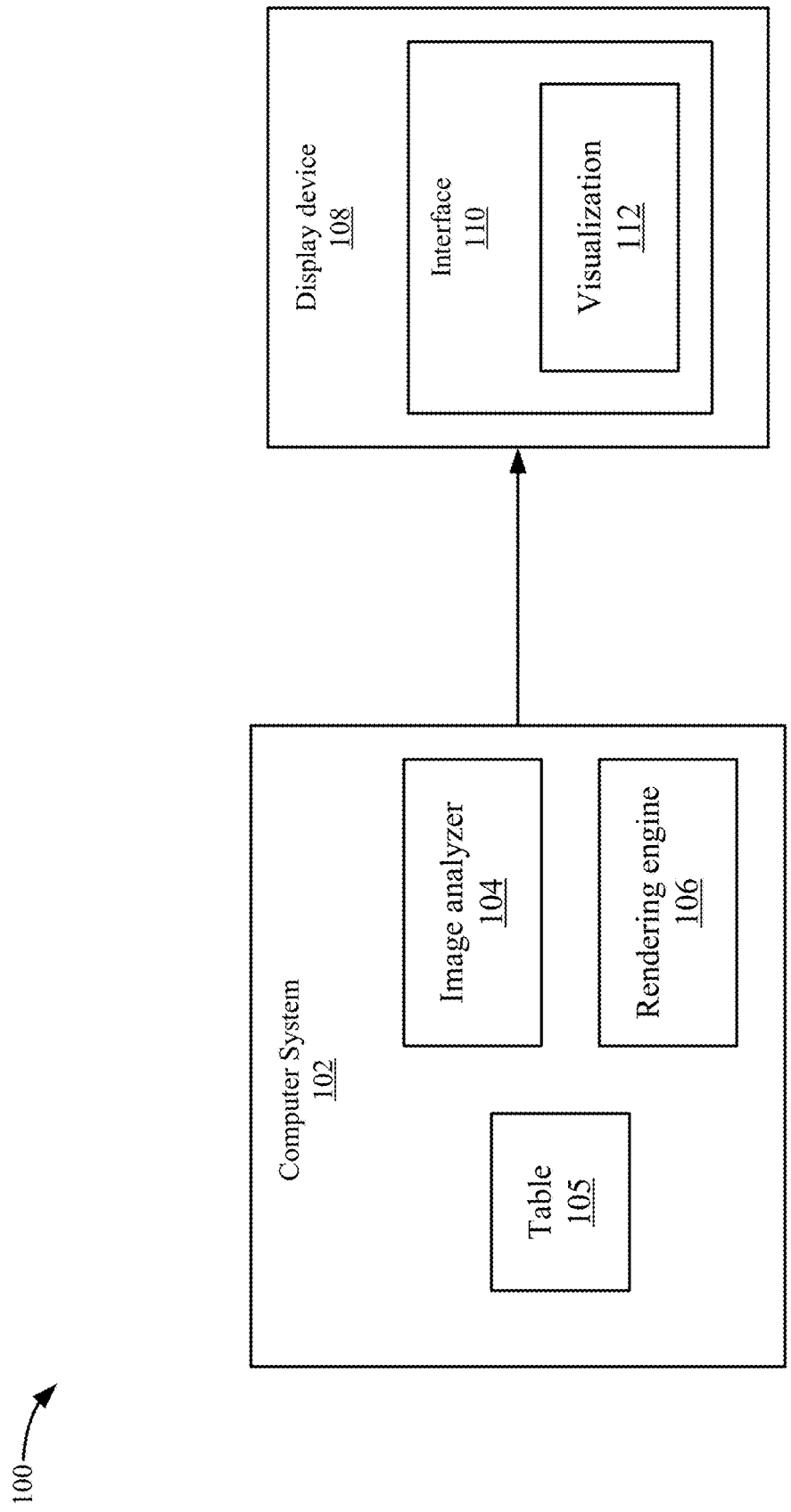

FIG. 1 depicts a simplified system 100 for generating data visualizations according to some embodiments. System 100 includes a computer system 102 and a display device 108. Although computer system 102 may be located separate from display device 108, both may be combined into one device.

Computer system 102 and display device 108 may include head-mounted devices, hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

Computer system 102 may execute applications, such as mixed reality applications, that can contain computer-generated simulations of objects and/or a computer-generated 360° environment that may be interacted with in a real or physical way by a user using computer system 102. Computer system 102 may include (a) a computer-based head-mounted display and special gloves or trackers or controllers or sensors such as infrared light emitting diode (LED) sensors, (b) stereoscopic viewers of a mobile electronic device and with a wearable tracker such as a fitness watch or band that contains gyroscope and accelerometer, or (c) glasses or projections into the eye or tablet or smartphone displays that mix real life content with computer-generated simulations (this latter variant is often termed augmented reality). Computer system 102 may store mixed reality environments on a personal computer (PC), on a computing cloud, or a mobile electronic device.

Computer system 102 includes an image analyzer 104, which can receive information for an image. Image analyzer 104 may generate x,y,z coordinates for voxels in the image. Image analyzer 104 may determine the x,y,z coordinates of each voxel. Further, image analyzer 104 generates any visual characteristics for each volume in the image. For example, voxels in each volume may be associated with a metric, such as a signal intensity of a voxel, a voxel identity (e.g., healthy versus diseased, or tissue type), or a scalar metric of relevance in medical research settings such as the Pearson's R correlation value. Image analyzer 104 stores the information in table 105.

Rendering engine 106 may then generate the links between voxels using the information in table 105. A voxel represents a value on a regular grid in 3D space. Voxels may be represented by coordinates of their centers or vertices and include a volume of space in three dimensions. Rendering engine 106 may render links for voxels based on a metric for each volume, such as rendering engine 106 may determine a radius, color and/or tone based on a metric associated with the voxel. The generation of the links will be described in more detail below.

Rendering engine 106 may generate coordinates for the links. The coordinates may list a start point, an end point, or a central point for a link in the 3D space. Rendering engine 106 may also generate other information, such as which link is for which object in the visualization. Further, rendering engine 106 may generate visual characteristics for the links, such as a color, radius, tone, or other characteristics. Table 105 may store information for the coordinates of each link, the visual characteristics, etc.

Rendering engine 106 can render the 3D image using the information for the links. For example, rendering engine 106 renders links in the 3D space according to the start point, end point, or a central point, and any visual characteristics for the links. The outlines for voxels may not be rendered, but instead the voxels are represented by links. As is discussed herein, the use of links with calculated twists allows links in the same position in a direction to be viewed without occlusion.

Display device 108 includes an interface 110 that displays a visualization 112. Interface 110 may be part of computer system 102, such as part of a headset or smart phone. Rendering engine 106 can also alter the image according to a user's point of view. For example, as a user moves his/her headset, rendering engine 106 may move the visualization based on the user's point of view. Examples of visualization 112 will be described in more detail below.

Note that a regular 2D computer screen may be used to visualize a 3D environment, and though this may not be defined as a mixed reality interface, some embodiments can be used irrespective of the methods of viewing (e.g., display device 108 is not limited to a mixed reality viewing interface.

Figure 2A:
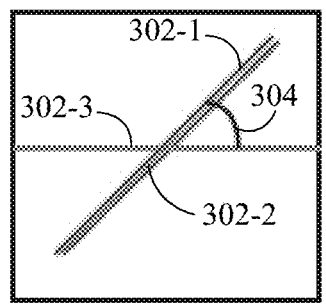

Rendering engine 106 may represent voxels in a volume with webs of links that include gradations of angles (twists) dependent on the position of the voxel in the x, y, z planes. The surfaces of the six sides of the voxels may not be rendered, but rather voxels are represented by a link in the x, y, z planes. FIG. 2A depicts an example of three links according to some embodiments. In some embodiments, rendering engine 106 generates one link for each voxel, with twists at an angle, such as Euler angles determinant on the position in x, y, z space, such that the links behind one another do not occlude one another when viewed from any of the x,y,z planes. Although one link per voxel is discussed, rendering engine 106 may generate a different number of links.

The link in the x,y,z planes may be twisted compared to each other. For example, in FIG. 2A, a link 302-1 and a link 302-2 is twisted by an angle 304 compared to a link 302-3. In some embodiments, link 302-1 and link 302-2 are twisted by an angle, such as a Euler 1 angle of 45 degrees. Euler angles will be described, but other types of angles in the x,y,z planes may be used.

Figure 2B:
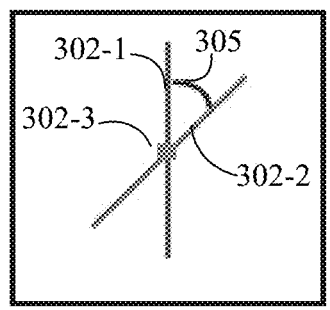

FIG. 2B shows a different perspective of the three links according to some embodiments. The following is used to describe the twists in angle. Euler angles are three angles to describe the orientation of any rigid body with respect to a fixed coordinate system (e.g., Euler 1, Euler 2, Euler 3). Twisting a link in different Euler angles can prevent occlusion of links when viewed from some angles. For example, links 302-1, 302-2, and 302-3 are three different links of the same length that could each represent a voxel and that have different rotations. In this example, the links share a central point in a coordinate space, but rotate along with different Euler angles. These links 302 may overlap when viewing from some angles in the coordinate space. For instance when viewing links in the X-Y plane, there may be links that appear to overlap. In this case, link 302-1 and link 302-2 have the same rotation in Euler angle one (at 304 in FIG. 2A), but have a different rotation in Euler angle 2 (at 305 in FIG. 2B). Both link 302-1 and link 302-2 have a different rotation in Euler angle 1 (at 304 in FIG. 2) from link 302-3, while changes in Euler angle 2 will not make a difference in the appearance of link 302-3 as this will only make it rotate around an axis running along the length of the link. However, if a different shape of link such as a curved link instead of a straight link as described below, the appearance of link 302-3 would also change when rotated around Euler angle 2. When viewed from one plane, link 302-1 and link 302-2 appear to occlude one another as the links share Euler angle one but do not occlude link 302-3 as this link has a different Euler angle 1 (at 304 in FIG. 2). However, when viewed from a different angle (e.g., a 90 degrees rotation), link 302-1 and link 302—no longer occlude each other as the links have a different Euler angle 2 (at 305 in FIG. 2B). By rotating the links around the Euler angles in a manner where each Euler angle twist is dependent on the position of the link representing the voxel is x,y,z space, rendering engine 106 can make a structure in which all links for voxels with different z positions are twisted along one Euler angle such that the links do not occlude each other when viewed in the x-y plane, and all voxels with different y positions have links that are twisted along another Euler angle such that the links do not occlude each other when viewed in the x-z plane, and all voxels with different x positions have links that are twisted along another Euler angle such that the links do not occlude each other when viewed in the Y-Z plane.

Figure 3A:
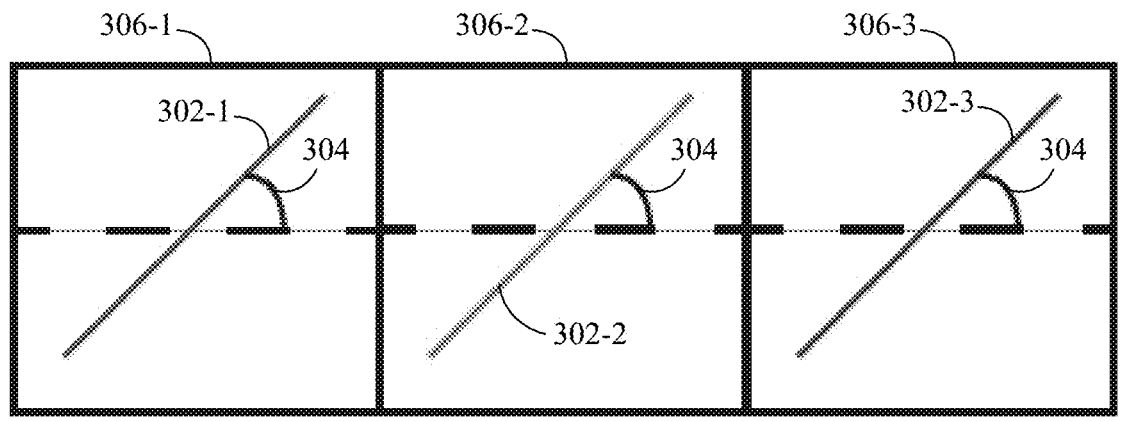

FIG. 3A demonstrates how three links may be used to represent three different voxels in 3D space for an image according to some embodiments. In an image, such as a scanned image, each voxel will occupy a space with a unique x,y,z central coordinate in a coordinate space. In this example, the three voxels 306-1 to 306-3 have coordinates Y and Z in common and share Euler angle 1 (at 304 in this example), but have different X coordinates and hence links 302-1 to 302-3 for voxels 306-1 to 306-3 appear as parallel lines in the X-Y plane rather than occluding lines although links 302-1 to 302-3 share Euler angle 1 because links 302-1 to 302-3 have a different position in the coordinate space. Similarly in the X-Z plane, due to having a different position in the coordinate space along the x-axis, links 302-1 to 302-3 do not occlude. Links 302-1 to 302-3 occlude, however, when viewed in the Y-Z plane as the voxels are in a line behind one another.

Figure 3B:
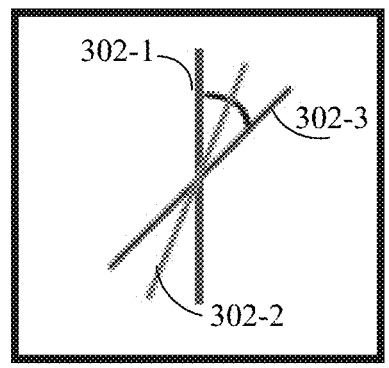

FIG. 3B shows a different perspective of the three links 302-1 to 302-3 for the three voxels 306-1 to 306-3 according to some embodiments. In this example, the same three voxels 306-1 to 306-3 from FIG. 3A are now all in a line behind one another as viewed in the Y-Z plane such that the top voxel occludes the two voxels behind it and a user can only view the top voxel. However, as Euler angle 2 differs for the three voxels according to the X-position, links 302-2 and 302-3 that represent the two voxels 306-2 and 306-3 behind the top voxel 306-1 can be seen in a fanning pattern. Simply put, the purpose of twists in links as described by Euler angles is to prevent occlusion for voxels that are behind other voxels.

Figure 3C:
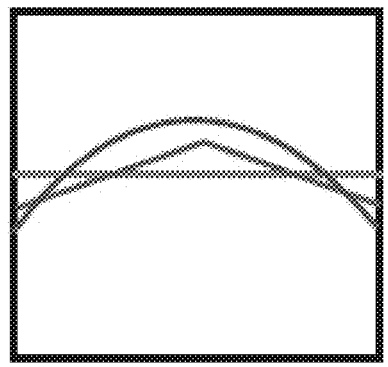

FIG. 3C depicts other types of links according to some embodiments. The straight link may have a rotation that may run along an axis running along the length of the link. However, using links that are not straight, such as V-links, curved links, or other shapes would allow links to be visualized for such rotations along an axis running along the length of the link. Some embodiments may automatically change links from straight to non-straight when occlusion is detected. Note that different combinations of Euler angles can still result in visually identical links (such as a 405 degree rotation or a 45 degree rotation along a Euler angle would result in a link with the same visual rotation) and so optimization, may be used for a use case to prevent occlusion. In the case of medical images, for example, an MRI scan of any subject's brain on a given scanner scanned with a standard set of parameters, may result in a 3D medical scan in which the coordinate space occupied by the head and the size of the voxels are roughly similar and/or identical, and hence, optimization can be used for every use case such that occlusion is prevented generally for all such scans.

Figure 4A:
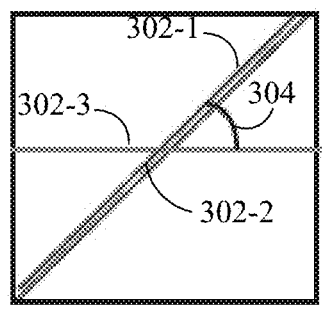

Rendering engine 106 also determines the length of the links. FIG. 4A depicts an example of the length of links in a voxel according to some embodiments. Rendering engine 106 may calculate the length of links 302-1, 302-2, and 302-3 based on the twist of the Euler angle. In the example used, since a voxel is a 3D cube, when a link is twisted, it may not reach to the end of the cube. In other words, if a voxel can be represented by a cube with a side of length a, the link that extends corner to opposite corner could have a length c where a^2+b^2=c^2 (Pythagorean theorem) and b=sqrt(2)*a, where sqrt is a square root, and would be longest possible length for any link that extended the entire length of that voxel. For this reason, the link is lengthened such that it extends the length of the cube. To extend the specific length of links in the above example, where the link has been twisted in the Euler 1 angle for link 302-1 and in both Euler angle 1 and the Euler 2 angle for link 302-2, the length of links can be calculated as follows $$\text{Length of a link } 302\text{-}3 = dist$$

$$\text{Length of a link } 302\text{-}1 = \frac{dist}{\text{cosine(Euler 1 angle)}},$$

$$\text{Length of a link } 302\text{-}2 = \frac{dist}{\text{(cosine(Euler 1 angle)} * \text{cosine(Euler 2 angle))}},$$

where dist is the length of a side of the voxel.

Figure 4B:
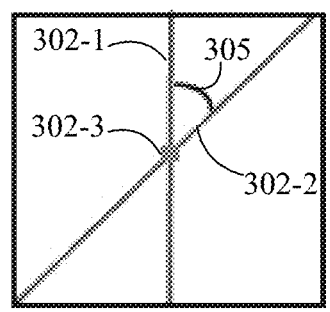

FIG. 4B depicts a different perspective of the length of links if the link is extended to fill the cube as outlined above according to some embodiments. The length of links 302-1, 302-2, and 302-3 extend based on the Euler angle twists to fill the voxel when viewed from this perspective, and from all angles.

Although links within a voxel are described, links may be generated between adjacent voxels. Rendering engine 106 may calculate the positions of the links may represent a weighted or un-weighted average value of the two adjacent voxels. In this scenario, instead of having the link extend from one side of the voxel to the other side of the voxel, the link may extend from the center of one voxel to the center of the adjacent voxel, and then twisted as per described based on the averaged x,y,z position of the two voxels.

Figure 4C:
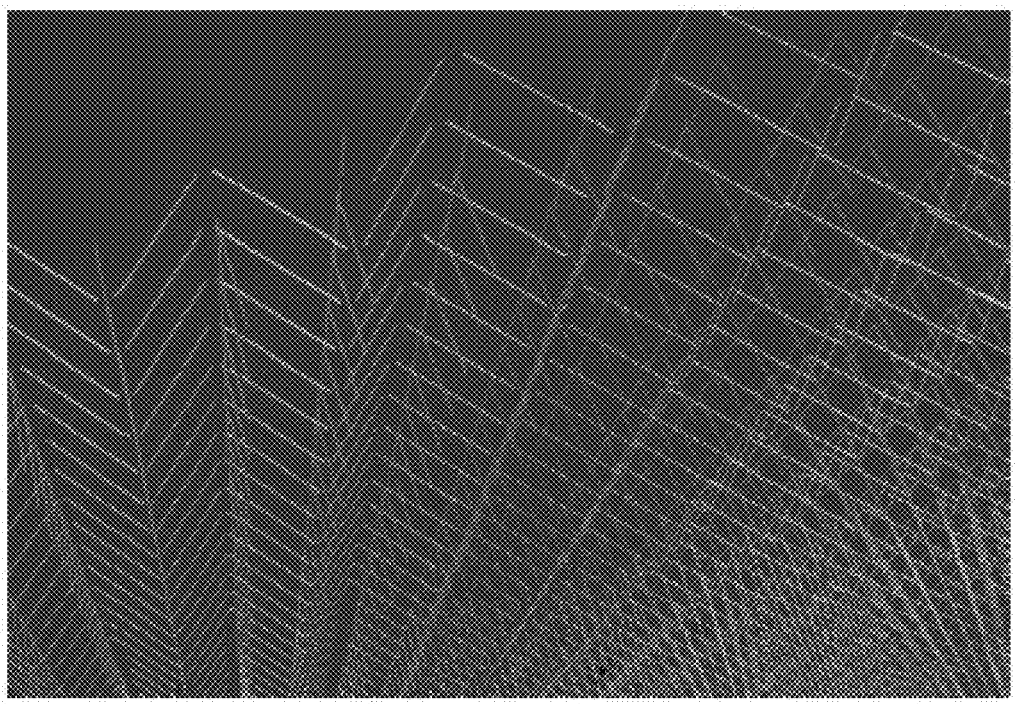

Adjacent links may be connected or almost connected at ends such that a web, such as an approximate 'fishnet' is formed by the links. FIG. 4C depicts an example of links that alternate negative and positive twists according to some embodiments. Rendering engine 106 arranges links in voxels in varying angles across each voxel to adjacent voxel. In some embodiments, rendering engine 106 arranges links in adjacent voxels in a 'fanning' pattern of angle 'twists' added as one progresses along each x, y, and z axis. In other words, rendering engine 106 arranges links in voxels that are adjacent to one another along the x-axis having a greater twist in angle as the links proceed along the x-axis such that every link in each voxel is visible when plotted in the y-z plane. Also, voxels that are adjacent to one another along the y-axis may have a greater twist in angle as the links proceed along the y-axis and are visible when plotted in the x-z plane. Further, voxels that are adjacent to one another along the z-axis may have a greater twist in angle as the links proceed along the z-axis and are visible when plotted in the x-y plane.

The twists prevent occlusion as described above and can be achieved if the twists in a Euler angle increase as distance in position increases along an axis. In other words, voxels with the same x-position may share one Euler angle twist in common, but do not occlude each other and instead appear as parallel links in other views due to the differences in y or z position. When viewed in the y-z plane these parallel links that would otherwise occlude, but do not because the links will differ in a second or third Euler angle twist that is dependent on the y or z position, and so appear in a fanning arrangement from a different view and do not occlude. In either case, the links do not occlude as a result regardless of the angle viewed. For the voxels with the same x-position, by alternating positive and negative (e.g. if the twist for this Euler angle is 45 degrees for all voxels with the same x coordinates, the twists will alternate between −45 and +45 degrees for adjacent voxels), instead of forming parallel links, they will form a fishnet type of arrangement instead. This is done for all voxels in the same y-position and z-position such that instead of parallel lines, fishnets are formed. The alternating may connect ends of links spanning adjacent voxels. The addition of slight gradations to the angle of each link in the x, y, z plane allows the entire volume to be visualized from different viewing angles and as the volume is rotated because this method prevents occlusions of voxels in the same plane in instances where occlusion would otherwise occur. The twisting of the links and alternating of positive and negative twists results in fishnets that can appear twisted (twisted fishnets).

In some embodiments, rendering engine 106 may twist the links for voxels by an angle that is calculated by twisting a link that represents each voxel in Euler 1, Euler 2, and Euler 3 angles to a degree determined by the x, y, and z position of that voxel in space.

Rendering engine 106 may generate multiple volumes for the visualization. The other volumes may be included in an overlapping coordinate space in the visualization. For example, one volume may be inside of another volume, on top of another volume, a volume may have a part overlapping another volume, etc. Rendering engine 106 may rotate the links of a first volume compared to links of a second volume. For example, the links of the first volume may be rotated orthogonally or approximately orthogonally to links of another volume. In some example, rendering engine 106 may generate a first volume that is on top of a second volume with a crosshatched fishnet where links representing the voxels of the first volume are placed orthogonally or approximately orthogonally (enough to differentiate visually) to the links of the second volume. Rendering engine 106 may place a third volume over top of the first two volumes using a third set of links that are arranged orthogonally or approximately orthogonally (enough to differentiate visually) from one of the first two volumes. In other words, links for crosshatched volumes are at right angles from the link for the original volume sharing the same x, y, and z positions.

Rendering engine 106 may also add visual characteristics, such as colors and/or gray-scale to resolve features and structures between and within the 3D volumes, or to differentiate overlaid volumes from one another, or to label features. For example, rendering engine 106 may vary the radius of the links based on a characteristic of the voxel, such as the signal intensity. For example, if a voxel has a value of 1, the link may be red, while if the voxel has a value of 0, the voxel may be blue and in between values for voxels may be represented by a link of an in between color on the red to blue color spectrum. Also, rendering engine 106 may vary the color based on which volume the voxel is part of or possibly a portion of a volume.

Figure 5:
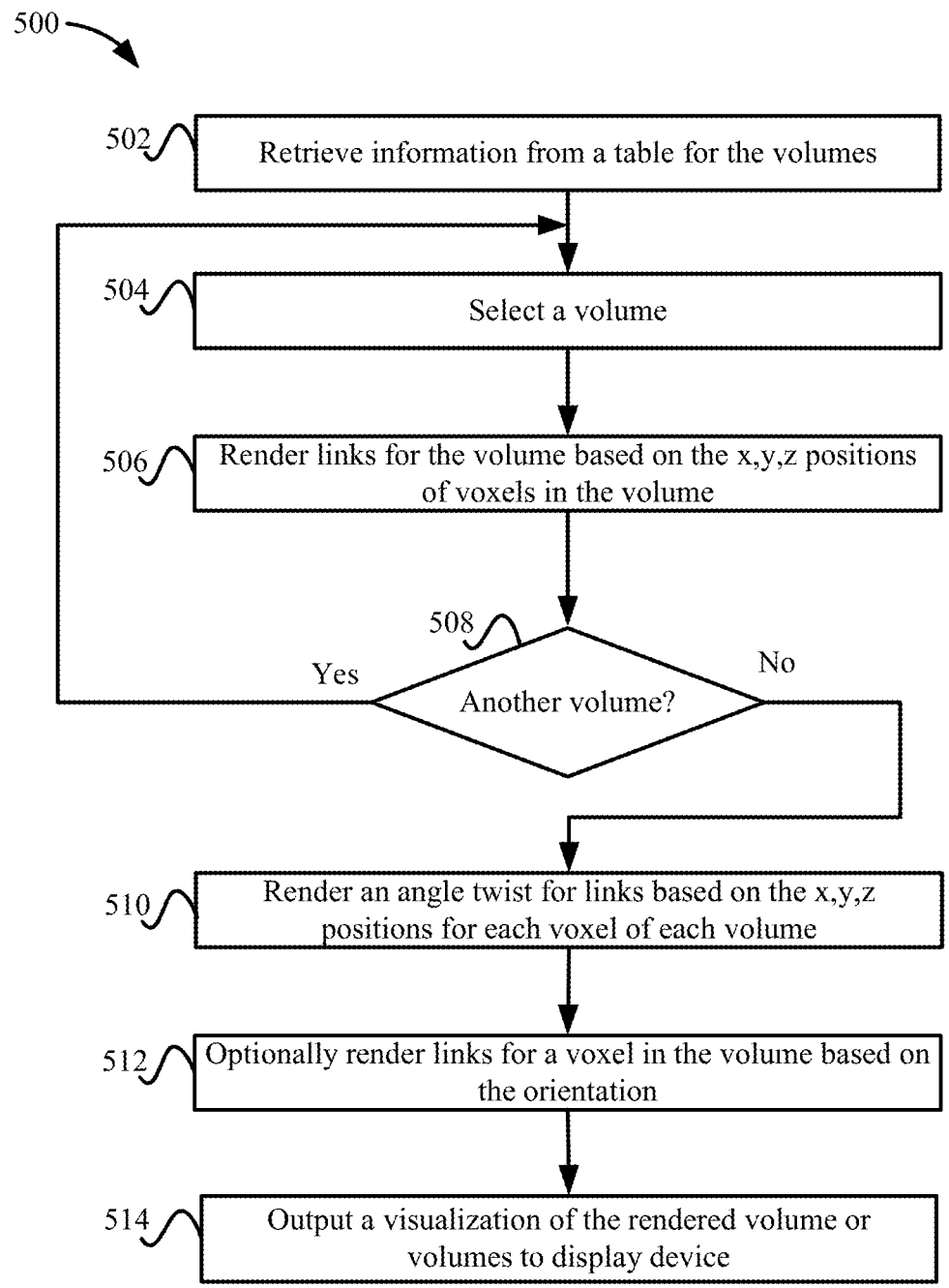

FIG. 5 depicts a simplified flowchart 500 of a method for rendering volumes according to some embodiments. At 502, rendering engine 106 retrieves information from table 105 for the volumes. The volumes may be from an image that image analyzer 104 previously analyzed and stored voxel coordinates and other visual characteristics in table 105. At 504, rendering engine 106 selects a volume. At 506, rendering engine 106 renders links for the volume based on the x,y,z positions of voxels in the volume. When finished, at 508, rendering engine 106 determines if another volume needs to be rendered. If so, the process reiterates to 504 where rendering engine 106 selects another volume and the process continues where rendering engine 106 renders links for voxels in the new volume. At 510, rendering engine 106 render an angle twist for links based on the x,y,z positions for each voxel of each volume. Based on x, y, and z coordinates of the current voxel, rendering engine 106 calculates an angle twist for the link. Then, rendering engine 106 adds the calculated angle twist to the link in x, y, and z directions. For example, all links are originally drawn identically but occupying the x, y, z position of the voxel, and the links are twisted by Euler angles 1, 2, and 3 to an extent that is proportional to the x, y and z position of that voxel. The Z-coordinate of a link may be reflected in a twist to the link with respect to the +x direction, the X-coordinate of a link may be reflected in a twist to the link with respect to the +y direction, and the Y-coordinate of a link may be reflected in a twist to the link with respect to the +z direction. At 512, rendering engine 106 may render links for a voxel in the volume based on the orientation. The orientation may be optional. The orientation may be based on whether other volumes have been rendered already. For example, rendering engine 106 may rotate links of one volume compared to another rendered volume. Also, rendering engine 106 may render the links based on a radius, color, and/or tone of the links based on a voxel signal intensity, such as an average signal intensity. Further refinement in visualization can also be added with one or more of the following manipulations: link lengths can be adjusted based on angle of the twist, an offset shift may be added to the center position of the link in respect to the position in the x, y, z plane, negative and positive twists may be alternated between adjacent voxels to create a more cohesive fishnet pattern, various forms of jitter may be added to prevent moire patterns. Random jitter may vary the amount of angle slightly as perfectly parallel links may generate a visual artifact in the form of a moire pattern.

At 514, rendering engine 106 outputs a visualization of the rendered volume or volumes to display device 108, which displays the visualization on interface 110 for the user.

Examples

Rendering engine 106 can generate cylinder-like links to represent voxels to render volumes for different images. FIG. 6A depicts an example of a rendering of a volume of a brain according to some embodiments. The rendering is from a magnetic resonance imaging of a brain. Rendering engine 106 generates links that cross the centers of each voxel. Also, rendering engine 106 may add color shading based on an averaged voxel signal intensity, as in, if a voxel in an image has a signal intensity value of 1.5 and the adjacent voxel has a signal intensity value of 0.5, the average signal intensity would be 1.0. In an MRI scan, the different tissue types have different signal intensities, which is how different parts of an organ can be visually parsed. In other instances, signal intensity may represent a scalar value such as 100 for ventricles, and 1000 for grey matter of the brain. When links between adjacent voxels in +x, y, and z directions are connected, the ends of each link connects center coordinates of every two adjacent voxels but an additional gradient twist in angle is added to the link such that voxels that are adjacent to one another along one axis have a greater twist in angle as the links proceed along the axis. The twist along the x-axis is visible when plotted in the y-z plane and in this case, and here, includes the following manipulations that include lengths adjusted based on angle of the twist, an offset added to the center position of the link in respect to the position in the x, y, z plane, negative and positive twists alternated to create a more cohesive fishnet pattern, and various forms of jitter. Overall, this gives the appearance of a twisted fishnet. For example, an MRI scan may contain 500,000 voxels to represent the 3D whole brain, each voxel has a distinct x, y, z coordinate to represent its position and another value to represent signal intensity. Each voxel can be represented by a link located at the same x, y, z coordinate space as the voxel it represents as well as a twist in Euler angles 1, 2, and 3 such that the links do not completely occlude one another when viewed from any angle.

FIG. 6B depicts an example of links for voxels according to some embodiments. Links 608-1, links 608-2, links 608-3, and links 608-4 are generated based on the x, y, and z coordinates of a respective voxel. Each group of links 608 is associated with a different voxel that has different x, y, and z coordinates. In some embodiments, each voxel has only one link, but links from the voxels behind a voxel that would otherwise be occluded by the one closest to the surface are not occluded if each voxel is represented by a link and the links behind that link are twisted such that the links are not occluded. As in, if a row of links are in a straight line, one may only be able to see the link in front, unless the links behind that link bends a little bit from the front link. If the links bend a bit more the further back the links are, one can see every link in that row.

FIG. 6C depicts an example of links alternating in a negative and positive manner according to some embodiments. Links 302-1 are oriented in a positive direction. Then, links 302-2 are oriented in a negative direction. Links 302-3 and 302-4 are also oriented in positive and negative directions with respect to each other. Similarly, links 302-1 and 302-3 and links 302-2 and 302-4 are oriented in positive and negative directions with respect to each other. The links shown are oriented in one plane, such as the x-y plane. However, the links are oriented positively and negatively for all three planes.

FIG. 6D depicts an example of lengthening links according to some embodiments. Some links have been lengthened to connect to links in an adjacent voxel. For example, link 302-1 has been lengthened to meet link 302-2.

FIG. 6E depicts an example of twisted links for voxels according to some embodiments. The angles of links for voxels in the same position have been twisted such that links from different voxels can be viewed.

FIG. 6F depicts an example of adding jitter to links according to some embodiments. Perfectly aligned links may lead to moire effects, which are a type of interference. At 614, a link has an added jitter to its angle of twist with respect to the other links. At 616, the centers of the links are offset to add jitter. Rendering engine 106 may add the jitter randomly to links during generation of the links for voxels.

Referring back to FIG. 6A, at 602, links for a rendering from a magnetic resonance imaging of a brain are shown. A close up of the rendering is shown at 604 to show the links. At 606, links from the volume displayed at 604 are presented without color shading. Also, at 606, the links have added transparency. Note that because the rendered volume is a 3D volume, this volume can be rotated and viewed from multiple vantage points in a mixed reality application. This differentiates this visualization from other images that appear similar when displayed on a 2D interface as it has been presented for this figure. In mixed reality, rendering engine 106 may rotate the 3D visualization, but a user may also walk around the stationary 3D visualization to view the entire volume hence rotating the perspective rather than the 3D fishnet volume. At 608, a top view of the brain is shown, the side view of the brain is shown at 610, and the front view of the brain is shown at 612. Because the twists, one can view the inside of the brain without occlusion and can rotate and view the brain from 360 degrees.

Note that a segmentation algorithm was not applied to differentiate the brain into different volumes prior to plotting. Rendering engine 106 represented links with lighter shades from voxels with scalar values with greater signal intensities and links with darker blue shades from voxels with lower signal intensities.

One advantage of some embodiments is that rendering engine 106 can render links based on scalar values without segmentation of the brain into volumes. This is useful because the sections of the brain can be differentiated in the visualization without segmentation. In cases such as in acute stroke, segmentation algorithms often fail. Here, rendering engine 106 used five color shades, but more or less colors can be used to provide a more nuanced rendering or color gradations can be continuous.

FIG. 7 depicts different views 702 to 712 of one fishnet rendering for a volumetric image (a CT scan of the lungs) according to some embodiments. The visualization includes links between centers of each voxel and adjacent voxels in +x, y, and z directions and color shading based on averaged voxel signal intensity. The color shading is shown in different colors in FIG. 7 and appears differently when rotating the volume.

FIG. 8 depicts different views of another visualization of a volume according to some embodiments and in this case a CT whole brain scan of the brain after acute stroke as well as a second perfusion weighted scan overlaid atop of the first scan that shows the region of perfusion deficit. At 802, 806, 810, and 814, the visualization includes a first whole brain volume from a first structural computerized tomography (CT) scan of the brain. Rendering engine 106 generates links in each voxel and adjacent voxels in +x, y, and z directions and generates color shading for the links based on averaged voxel signal intensity. The color shading is shown in different colors in FIG. 8 and appears differently when rotating the volume.

At 804, 808, 812, 816, a second volume from a perfusion weighted CT scan of the same brain. Rendering engine 106 uses the time-to-peak map as typically used in stroke diagnostics to generate the color shading for links in the voxels. For example, rendering engine 106 generated color shading for links from blue to red for lower to higher values from the time-to-peak map. In this case, the visualization makes under-perfused regions of the brain visible in this acute stroke patient using redder tones.

FIG. 9 depicts an example of a visualization with multiple volumes according to some embodiments. In some embodiments, the visualization is of the whole brain. Rendering engine 106 renders a first set of volumes at 902, 904, and 906, and a second set of volumes at 908, 910, 912, and 914. In this case, the first set of volumes is based on segmentations of specific brain structures and regions and a second set of volumes is based on segmentations of white and grey matter. The first set of volumes include multiple volumes of the brain and the second set of volumes include multiple volumes of the brain. Note that though these are segmented volumes, the volumes can also reflect scalar gradations. These examples are chosen for demonstration purposes but in clinical settings, it is likely that crosshatched volumes will represent separate scan type volumes such as diffusion scans and perfusion scans rendered atop of the structural brain scan. To demonstrate what these fishnet and crosshatched fishnet objects looks like from different angles, here it is presented from different angles with the first set of volumes when viewed from an angle (at 902), the front (at 904), the side (at 906), and additionally with the second set of volumes from the top (at 908), the side (at 910), the back (at 912) and the other side (at 914). The color shading is shown in different colors for different volumes and appears differently when rotating the volume.

Note that solid colors are used in this example of volumes but links may also take on gradations in color scale or tone as would be valuable in rendering a volume of distributed values (such as the time-to-peak map in stroke diagnostics). Link coloring can be made interactive if needed in some medical research settings when a scientist sets a seed voxel at a certain location and plots the functional connectivity with the Pearson's R correlation value between the seed and other voxels within the volume. Hence, these links may have face colorings that alter dynamically.

Mixed Reality Application

The visualization may be used in a mixed reality application. FIG. 10 depicts an example of using a mixed reality application to view visualizations according to some embodiments. A 2D image is generated but as one rotates around a 3D object of environment, a new 2D image of the 3D object and environment is rapidly generated to give an illusion of presence in a 3D space. To view fishnet and crosshatched fishnet renderings, the same principles apply as for any other 3D object and environment. Hence, to allow the 360 degree viewing of the visualization of the 3D rendered fishnet, the image analyzer will rotate the viewers perspective of the 3D object to render the object from a different angle.

In research settings however, a more interactive interface is sometimes desired such as being able to choose a seed voxel and determine the correlation with every other voxel. To allow for a more interactive interface where the user interacts with the object by selecting a seed voxel one may generate a lookup table that describes relationships between each voxel and every other voxel such as the correlation of the signal between any two voxels. Then, an input for a seed voxel is received. The seed voxel may be a point of focus of the input controller. The seed voxel is the signal time series that every other voxel's time-series in the brain is correlated against for example. If another seed voxel is chosen, the signal time series of that voxel is used to correlate against the time series of every other voxel in the brain. Based on the seed voxel, rendering engine 106 changes the colors of links to reflect values in the lookup table for the seed voxel's relationship with all other voxels. A look up matrix is generated that stores the values of these correlations as real time calculation of the correlation values of so many voxels may be take too much time, although real time calculation may be performed.

Input selecting other seed voxels may be received from the controller, and rendering engine 106 changes the colors of links to reflect the values from the lookup table corresponding to the chosen seed. In this way, the visualization dynamically changes.

In some embodiments, multiple users can interact with the same rendered fishnet and crosshatched objects over a network. A virtual reality head-mounted device 1002 with hand tracking may be used by a medical practitioner who loads fishnet rendering(s) of medical scans stored on a computing cloud 1004 and opens the patient medical scan volume into the mixed reality environment. The practitioner may rotate the objects around in their field of view using hand tracking or may physically move themselves around the renderings. A second user using an augmented reality viewer 1006 may be able to view the brain and also rotate the object, while the two discuss the patient's treatment.

System

FIG. 11 illustrates an example of special purpose computer systems 1100 configured with computer system 102 according to one embodiment. Only one instance of computer system 1100 will be described for discussion purposes, but it will be recognized that computer system 1100 may be implemented for other entities described above, such as [other entities].

Computer system 1100 includes a bus 1102, network interface 1104, a computer processor 1106, a memory 1108, a storage device 1110, and a display 1112.

Bus 1102 may be a communication mechanism for communicating information. Computer processor 1106 may execute computer programs stored in memory 1108 or storage device 1108. Any suitable programming language can be used to implement the routines of some embodiments including C, C++, Java, assembly language, etc. Different programming techniques can be employed such as procedural or object oriented. The routines can execute on a single computer system 1100 or multiple computer systems 1100. Further, multiple computer processors 1106 may be used.

Memory 1108 may store instructions, such as source code or binary code, for performing the techniques described above. Memory 1108 may also be used for storing variables or other intermediate information during execution of instructions to be executed by processor 1106. Examples of memory 1108 include random access memory (RAM), read only memory (ROM), or both.

Storage device 1110 may also store instructions, such as source code or binary code, for performing the techniques described above. Storage device 1110 may additionally store data used and manipulated by computer processor 1106. For example, storage device 1110 may be a database that is accessed by computer system 1100. Other examples of storage device 1110 include random access memory (RAM), read only memory (ROM), a hard drive, a magnetic disk, an optical disk, a CD-ROM, a DVD, a flash memory, a USB memory card, or any other medium from which a computer can read.

Memory 1108 or storage device 1110 may be an example of a non-transitory computer-readable storage medium for use by or in connection with computer system 1100. The non-transitory computer-readable storage medium contains instructions for controlling a computer system 1100 to be configured to perform functions described by some embodiments. The instructions, when executed by one or more computer processors 1106, may be configured to perform that which is described in some embodiments.

Computer system 1100 includes a display 1112 for displaying information to a computer user. Display 1112 may display a user interface used by a user to interact with computer system 1100.

Computer system 1100 also includes a network interface 1104 to provide data communication connection over a network, such as a local area network (LAN) or wide area network (WAN). Wireless networks may also be used. In any such implementation, network interface 1104 sends and receives electrical, electromagnetic, or optical signals that carry digital data streams representing various types of information.

Computer system 1100 can send and receive information through network interface 1104 across a network 1114, which may be an Intranet or the Internet. Computer system 1100 may interact with other computer systems 1100 through network 1114. In some examples, client-server communications occur through network 1114. Also, implementations of some embodiments may be distributed across computer systems 1100 through network 1114.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
 receiving, by a computing device, voxel coordinates of voxels in a volume in an image;
 generating, by the computing device, links for the voxels in the volume in x, y, and z directions;
 calculating, by the computing device, an angle twist for the links of the voxels based on the voxel coordinates for each voxel, wherein links for adjacent voxels along each of an x axis, y axis, and z axis are twisted by different angle gradations as distance along the axis increases; and rendering, by the computing device, the links for the voxels in a three dimensional space, wherein the links are rendered with the calculated angle twist in the x, y and z directions.

2. The method of claim 1, further comprising:
adding a visual characteristic to a link in a voxel based on a feature of the voxel.

3. The method of claim 2, wherein the feature comprises a signal intensity of the voxel.

4. The method of claim 2, wherein the visual characteristic is changed based on a value of the feature of the voxel.

5. The method of claim 1, wherein calculating the angle twist comprises:
for a value of a coordinate on one of the x axis, y axis, or z axis, calculating a same angle twist for all links of voxels that fall within the coordinate.

6. The method of claim 5, wherein calculating the angle twist comprises:
for a value of the coordinate on one of the x axis, y axis, or z axis, alternating between a positive and negative angle twist for adjacent links of voxels that fall within the coordinate.

7. The method of claim 6, wherein alternating between the positive angle twist and the negative angle twist comprises:
connecting ends of adjacent links by the alternating.

8. The method of claim 1, wherein calculating the angle twist comprises:
changing a value of the angle twist for links of voxels as a value along one of the x axis, y axis, or z axis increases.

9. The method of claim 1, wherein calculating the angle twist comprises:
changing a value of the angle twist for links of voxels as a value along the x axis increases;
changing a value of the angle twist for links of voxels as a value along the y axis increases; and
changing a value of the angle twist for links of voxels as a value along the z axis increases.

10. The method of claim 1, wherein calculating the angle twist comprises:
using a Euler angle as the angle twist.

11. The method of claim 1, wherein calculating the angle twist comprises:
using a first Euler angle as the angle twist in the x direction;
using a second Euler angle as the angle twist in the y direction;
using a third Euler angle as the angle twist in the z direction.

12. The method of claim 1, wherein the volume comprises a first volume, the method further comprising:
receiving voxel coordinates of voxels in a second volume in the image;
generating links for the voxels in the second volume in x, y, and z directions;
calculating the angle twist for the links of the voxels based on the coordinates for each voxel in the second volume, wherein links for adjacent voxels along each of the x axis, y axis, and z axis are twisted by different angle gradations as distance along the axis increases;
calculating an orientation of the links for the second volume, wherein the second orientation is different from a first orientation of the links for the first volume; and
rendering the links for the voxels of the second volume in three dimensional space, wherein the links are rendered with the calculated angle twist in the x, y, and z directions and the second orientation.

13. The method of claim 12, wherein the first orientation is orthogonal to the second orientation.

14. The method of claim 1, further comprising:
adding an offset to a link of a voxel.

15. The method of claim 1, further comprising:
adjusting a length of a link to reach an edge of a voxel after applying the angle twist to the link.

16. The method of claim 1, further comprising:
adding jitter to the angle twists of links.

17. The non-transitory computer-readable storage medium having stored thereon computer executable instructions, which when executed by a computing device, cause the computing device to be operable for:
receiving voxel coordinates of voxels in a volume in an image;
generating links for the voxels in the volume in x, y, and z directions;
calculating an angle twist for the links of the voxels based on the voxel coordinates for each voxel, wherein links for adjacent voxels along each of an x axis, y axis, and z axis are twisted by different angle gradations as distance along the axis increases; and
rendering the links for the voxels in a three dimensional space, wherein the links are rendered with the calculated angle twist in the x, y, and z directions.

18. The non-transitory computer-readable storage medium of claim 17, further operable for:
adding a visual characteristic to a link in a voxel based on a feature of the voxel.

19. The non-transitory computer-readable storage medium of claim 17, wherein the volume comprises a first volume, further operable for:
receiving voxel coordinates of voxels in a second volume in the image;
generating links for the voxels in the second volume in x, y, and z directions;
calculating the angle twist for the links of the voxels based on the coordinates for each voxel in the second volume, wherein links for adjacent voxels along each of the x axis, y axis, and z axis are twisted by different angle gradations as distance along the axis increases;
calculating an orientation of the links for the second volume, wherein the second orientation is different from a first orientation of the links for the first volume; and
rendering the links for the voxels of the second volume in three dimensional space, wherein the links are rendered with the calculated angle twist in the x, y, and z directions and the second orientation.

20. An apparatus comprising:
one or more computer processors; and
a computer-readable storage medium comprising instructions for controlling the one or more computer processors to be operable for:
receiving voxel coordinates of voxels in a second volume in an image;
generating links for the voxels in the second volume in x, y, and z directions;

calculating an angle twist for the links of the voxels based on the voxel coordinates for each voxel in the second volume, wherein links for adjacent voxels along each of an x axis, y axis, and z axis are twisted by different angle gradations as distance along the axis increases;

calculating an orientation of the links for the second volume, wherein the second orientation is different from a first orientation of the links for the first volume; and rendering the links for the voxels of the second volume in a three dimensional space, wherein the links are rendered with the calculated angle twist in the x, y, and z directions and the second orientation.

\* \* \* \* \*